United States Patent [19]
Flannelly

[11] 3,784,363
[45] Jan. 8, 1974

[54] DAMPED GYROSCOPIC STABILIZER

[75] Inventor: William G. Flannelly, South Windsor, Conn.

[73] Assignee: Kaman Aerospace Corporation, Bloomfield, Conn.

[22] Filed: Apr. 28, 1971

[21] Appl. No.: 138,259

[52] U.S. Cl. .................................... 74/5.34, 74/5.5
[51] Int. Cl. ............................................ G01c 19/00
[58] Field of Search ................... 74/5.22, 5.34, 5.5; 73/430

[56] References Cited
UNITED STATES PATENTS

| | | | |
|---|---|---|---|
| 2,512,279 | 6/1950 | Jones | 74/5.34 |
| 1,050,153 | 1/1913 | Marmonier | 74/5.34 X |
| 2,811,047 | 10/1957 | Christoph | 74/5.34 X |
| 2,811,042 | 10/1957 | Kenyon | 74/5.22 |
| 2,581,846 | 1/1952 | Eriksson | 74/5.22 |

FOREIGN PATENTS OR APPLICATIONS

| | | | |
|---|---|---|---|
| 265,949 | 7/2972 | Great Britain | 74/5.5 |

Primary Examiner—Manuel A. Antonakas
Attorney—McCormick, Paulding & Huber

[57] ABSTRACT

A damped gyroscopic stabilizer employs two gyroscopes, each having a gyroscopic mass and a drive motor for rotating the mass about a spin axis to generate gyroscopic stabilizing moments. The gyroscopes are universally pivotally mounted on a support frame so that the spin axes of the gyroscopic masses may assume a generally aligned relationship in a normally stable or steady-state condition. A coupling connected between the two gyroscopes constrains the gyroscopes to pivotal motions with respect to the support frame which are equal in magnitude but are opposite in sense. With the pivotal motions so constrained, stabilizing moments generated by the gyroscopes are applied additively to the support frame and stabilize the frame about axes perpendicular to the normally aligned spin axes. A damping mechanism is connected between the two gyroscopes to limit or damp the universal pivoting motions of the gyroscopes and the associated stabilizing effect of the gyroscopes on the support frame. The damping mechanism is adjustable and can eliminate all universal pivoting motion and the stabilizing effect of the two gyroscopes.

13 Claims, 5 Drawing Figures

PATENTED JAN 8 1974
3,784,363
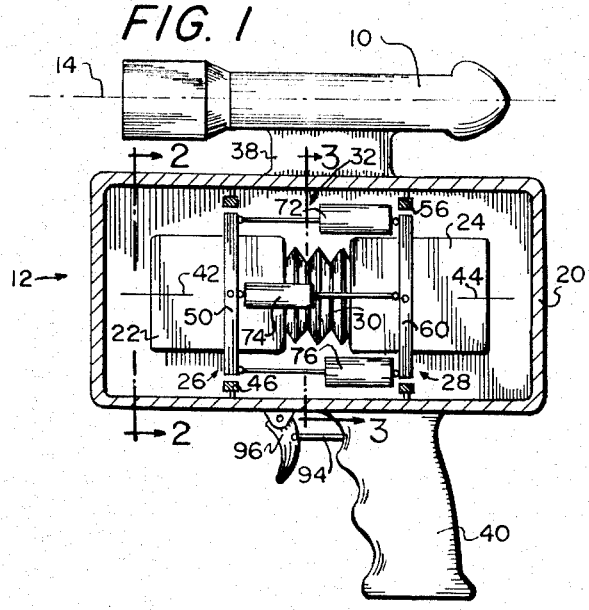
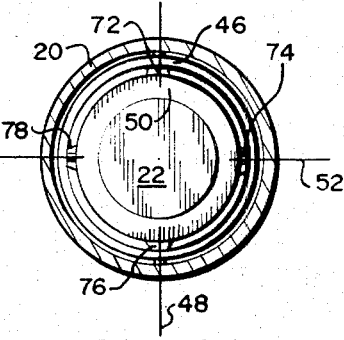
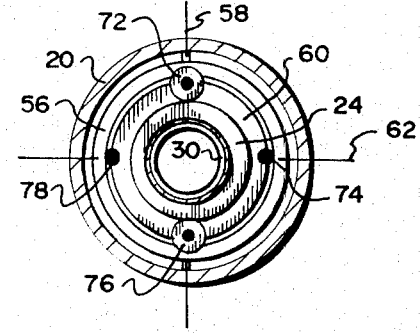
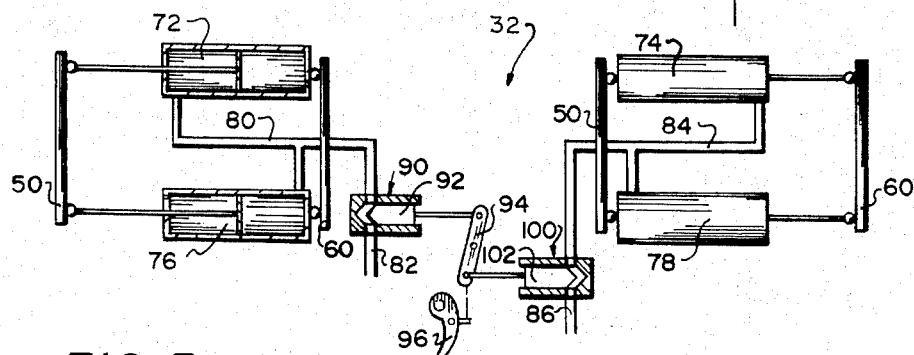
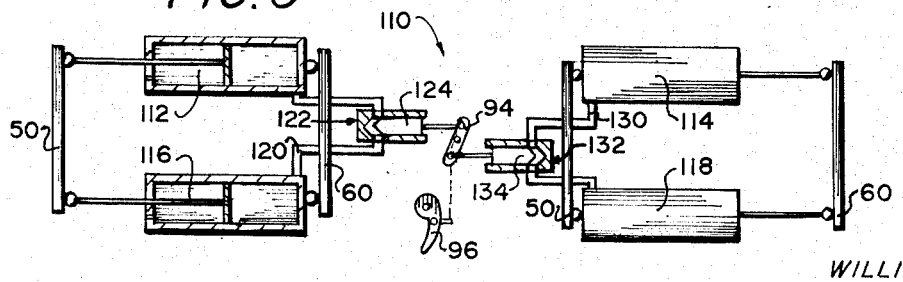
INVENTOR.
WILLIAM G. FLANNELLY
BY
McCormick, Paulding & Huber
ATTORNEYS 3,784,363

1

DAMPED GYROSCOPIC STABILIZER

BACKGROUND OF THE INVENTION

This invention relates to devices for stabilizing objects or bodies against externally applied vibratory movements and, more particularly, relates to gyroscopic stabilizing devices in which the stabilizing effect is adjustable.

In many devices which are stabilized by means of gyroscopes, it is desirable to eliminate the stabilizing effect during one or more intervals so that the device can be sensitized in a given position or moved between two different positions without having to completely de-energize the gyroscopes or without having to torque the gyroscopes by means of sophisticated torquing mechanisms controlled from remote stations. For example, it is already well known to stabilize an optical instrument with the optical axis oriented in a selected direction by means of gyroscopes. If it is desired to change the orientation of the optical axis without shutting down the stabilizing system, the stabilizing effect must be physically opposed or some means be provided to eliminate the stabilizing effect while the change in orientation is effected. Physically opposing the stabilizing effect is not usually desirable since it makes the reorientation difficult and may additionally cause damage to the delicate gyroscopic components. Temporarily eliminating the stabilizing effect is, thereby, a more favorable alternative.

A stabilizing device related to the present invention and having two gyroscopes for holding an optical instrument or the like oriented in a given direction is disclosed in my co-pending U. S. Patent application entitled GYROSCOPIC STABILIZER, Ser. No. 114,310 filed Feb. 10, 1971 and having the same assignee as the present invention. In that application, a gyroscopic stabilizer is disclosed in which two universally pivotable gyroscopes have two gyroscopic masses which rotate in opposite directions about normally aligned spin axes. External disturbing moments applied to the stabilizer are opposed by the gyroscopes due to the additive effect of the gyroscopic restoring moments produced by a coupling interconnecting the gyroscopes. With such a stabilizer, it is desirable to be able to completely eliminate the gyroscopic stabilizing effect so that the stabilized instrument can be reoriented in any number of new directions.

It is, accordingly, an object of the present invention to disclose a damped stabilizer which can be adjusted to reduce or entirely eliminate the stabilizing effect.

SUMMARY OF THE INVENTION

The present invention resides in a damped gyroscopic stabilizer having a frame which supports a pair of gyroscopes, each having polar symmetry about its spin axis. Means are provided for individually pivotally mounting each of the gyroscopes on the frame to permit the spin axes of the gyroscopes to extend in a given direction with one gyroscope of the pair being pivotable with respect to the frame about axes normal to the spin axis of the one gyroscope and the other gyroscope of the pair being pivotable with respect to the frame about axes normal to the spin axis of the other gyroscope. The mounting means may be comprised, for example, of universal joints interposed between the gyroscopes and the frame. The universal joints permit the spin axes of the gyroscopes to extend in the same direction and allow the gyroscopes to pivot universally with respect to the frame. Coupling means are connected between the gyroscopes for restraining the gyroscopes from simultaneous pivotal movements having the same sense about axes normal to the spin axes and extending in the same direction. Motion damping means are connected to the pair of gyroscopes for damping the pivotal movements about at least the first and second axes and preferably all of the axes normal to the respective spin axes of the gyroscopes. The coupling means causes the restoring moments of the gyroscopes to be additively applied to the frame to produce the stabilizing effect. The motion damping means reduces or completely eliminates the stabilizing effect to permit the frame and any stabilized device connected to the frame to be moved to a new stabilized position.

BRIEF DESCRIPTION OF THE DRAWINGS

FIG. 1 is a side elevational view of a gyroscopically stabilized device embodying the present invention.

FIG. 2 is a sectional view of the stabilized device as seen along the sectioning line 2—2 in FIG. 1.

FIG. 3 is also a sectional view of the stabilized device as seen along the sectioning line 3—3 of FIG. 1.

FIG. 4 is a schematic diagram of the fluid damping mechanism partially shown in the embodiment of the invention in FIG. 1.

FIG. 5 is a schematic diagram showing another fluid damping mechanism which can be used in the stabilized device of FIG. 1 in place of the damping mechanism shown in FIG. 4.

DESCRIPTION OF THE PREFERRED EMBODIMENTS

FIG. 1 shows an instrument 10 which is mounted on a damped gyroscopic stabilizer, generally designated 12, embodying the present invention. The instrument 10 may be an optical instrument, such as a telescope or camera, or other similar instrument which is to be held in a stabilized condition by the stabilizer 12. For illustrative purposes only, the instrument 10 is assumed to be an optical instrument having an optical axis 14 held in a given direction by the stabilizer 12 so that a clear image of the objects being observed through the instrument can be had. Of course, other instruments which are to be held in a fixed position can also be utilized with the stabilizer 12.

The stabilizer 12 is a damped stabilizer which permits the optical axis 14 of the optical instrument 10 to be moved from one stabilized position to another and which stabilizes the instrument in each position so that vibrations from a supporting structure or trembling of a human operator or other disturbing forces are not transmitted to the instrument 10 and do not blur or otherwise depreciate the image produced in the instrument. As shown in FIGS. 1–4, the stabilizer 12 is composed of a support frame 20, a pair of gyroscopes 22 and 24, a corresponding pair of universal joints 26 and 28 connecting the respective gyroscopes 22 and 24 to the frame 20, a flexible coupling 30 interconnecting the gyroscopes 22 and 24 and an adjustable fluid damping mechanism, generally designated 32, connected between the gyroscopes 22 and 24.

As seen in FIG. 1 the optical instrument 10 is mounted to the upper side of the support frame 20 by means of a mounting pedestal 38. A pistol grip 40 for holding the stabilizer 12 and the optical instrument 10 is connected to the lower side of the frame 20. The grip 40 is held by a human operator in one hand while he uses his other hand to hold the instrument 10 against his eye to view a distant object located along the axis 14.

While the details of the gyroscopes are not shown for simplicity, the gyroscopes 22 and 24 are similarly constructed, self-contained units each of which contains a gyroscopic mass and a drive motor for rotating the mass about a spin axis. The mass of the gyroscope 22 is rotated in one direction about the spin axis 42 and the mass of the gyroscope 24 is rotated in the opposite direction about the spin axis 44 so that the gyroscopes have equal but opposite rotational momentums. In the preferred embodiment, each gyroscope takes the form of an electrical motor in which the rotor is the gyroscopic mass and is mounted externally of the stator. Power is delivered to the motor by means of flexible conductors (not shown) connected between the frame 20 and gyroscopes. Of course, it is also possible to mount the drive motors of the gyroscopes on the frame 20 and connect the motors to counter-rotated masses by means of flexible drive shafts or to use pneumatic hoses which direct jets of gas against impeller blades on the masses to motor or spin the masses in opposite directions.

The gyroscopes 22 and 24 are connected or suspended from the frame 20 of the stabilizer 12 by means of the universal joints 26 and 28 respectively. Each of the universal joints forms a gimbal system which permits the respective gyroscope 22 or 24 to pivot with respect to the frame about axes normal to its spin axis 42 or 44. The universal joints 26 and 28 are arranged so that the gyroscopes 22 and 24 can assume positions within the frame 22 in which the spin axes 42 and 44 are aligned. As seen in FIGS. 1 and 2, the universal joint 26 is composed of a gimbal ring 46 which is pivotally mounted to the frame 20 along a vertical axis 48 and pivotally connected to a flange 50 on the gyroscope 22 along a horizontal axis 52. The flange 50 is located coaxially about the spin axis 42 at the center of gravity of gyroscope 22 assuming that the weight of the coupling 30 is negligible. If the weight of coupling 30 is actually considered, the flange 50 would be located at the center of gravity of both the gyroscope 22 and the left-hand half of coupling 30 as seen in FIG. 1. By locating the flange 50 about the center of gravity, the geometric center of motion of the universal joint 26 is made coincident with the center of gravity and external moments due to gravity and linear accelerations of the instrument 10 and the stabilizer 12 are avoided.

The universal joint 28 shown in FIGS. 1 and 3 has the same construction as the joint 26. The joint 28 includes a gimbal ring 56 which is pivotally mounted to the frame 20 along a vertical axis 58 and pivotally connected to a flange 60 on the gyroscope 24 along a horizontal axis 62. The flange 60 is located coaxially of the spin axis 44 of gyroscope 24 at a position in which the center of motion of the universal joint 28 coincides with the center of gravity of gyroscope 24, again assuming that the weight of coupling 30 is negligible. If the weight of coupling 30 is considered, the flange 60 is positioned coaxially about the center of gravity of the gyroscope 24 and the right-hand half of the coupling 30 as seen in FIG. 1. Again the coincidence of the center of motion and the center of gravity avoids external moments due to gravity and other linear accelerations.

The coupling 30 is shown as having a bellows construction and extends between the gyroscopes 22 and 24. As seen in FIGS. 1 and 3, the coupling 30 is connected to the gyroscopes coaxially of the spin axes. The coupling 30 restrains the gyroscopes from pivoting simultaneously with the same sense or direction about axes parallel to each other and normal to the respective spin axes and constrains the gyroscopes to pivotal motions which are equal in magnitude but opposite in sense about the parallel axes normal to the spin axes. Such constraint causes the gyroscopic restoring moments generated by the gyroscopes 22 and 24 in response to external moments to be applied additively through the universal joints 26 and 28 to the frame 20 and optical instrument 10. In addition, the coupling 30 is formed from a metallic material which when flexed by the pivotal motions of the gyroscopes 22 and 24 resiliently restrains the motions and causes the gyroscopes to return to their aligned positions in the steady state condition in which no external moments are applied to the frame 20. For a more complete description of the stabilizing operation and alternative forms of the coupling 30, reference may be had to my co-pending patent application referenced above.

In accordance with the present invention, the stabilizer 12 is provided with the adjustable fluid damping mechanism 32 which attenuates or viscously damps the stabilizing effect of the coupled gyroscopes 22 and 24 on the support frame 20. Basically, the damping mechanism opposes the universal motions of the coupled gyroscopes which in turn interreacts the gyroscopic stabilizing moments generated by the coupled gyroscopes and limits the stabilizing effect on the support frame 20. The damping mechanism 32 is adjustable so that the degree of opposition or interreaction can be controlled. In the preferred embodiment of the invention, the damping mechanism is adjustable between one limit associated with effectively no viscous damping and an other limit associated with complete elimination of the stabilizing effect due to a locking of the two gyroscopes together.

The damping mechanism 32 as shown in FIGS. 1-4 includes four similarly constructed piston and cylinder assemblies 72, 74, 76 and 78 which extend between the flanges 50 and 60 in parallel relationship with each other and with the spin axes 42 and 44 of the gyroscopes 22 and 24 when the spin axes are aligned. The pistons of the assemblies 72 and 76 and the cylinders of the assemblies 74 and 78 are connected to the flange 50 by means of universal joints. Similarly, the cylinders of assemblies 72 and 76 and the pistons of assemblies 74 and 78 are connected by means of universal joints to the flange 60. The universal joints connecting the assemblies to the flanges are spaced on the flanges 50 and 60 at 90° intervals about the spin axes of the gyroscopes 22 and 24 adjacent one of the axes 48, 52, 58 or 62. With such connections, the opposed pair of assemblies 72 and 76 is actuated to displace the pistons within the cylinders by pivotal motions of the gyroscopes about axes 52 and 62 while the opposed pair of assemblies 74 and 78 is actuated to displace the pistons within the cylinders by pivotal motions of the gyros about axes 48 and 58. Composite motions about all of the axes actuate both opposed pairs of assemblies.

As seen in FIG. 4 the piston and cylinder assemblies 72 and 76 of one opposed pair are interconnected by means of a flexible fluid manifold 80 having an open conduit 82. The manifold 80 is flexible to permit the cylinders of assemblies 72 and 76 to move freely relative to the frame 20 and to each other during the universal motion of the gyroscopes. Fluid passes either into the manifold 80 from the interconnected cylinder chambers when the gyroscopes 22 and 24 pivot in one direction about the axes 52 and 62 or passes from the manifold 80 into the cylinder chambers when the gyroscopes pivot in the opposite direction about axes 52 and 62. The fluid displaced through the manifold 80 due to the motions of gyroscopes 22 and 24 must be either exhausted through or ingested into the open end of the conduit 82. The open end may communicate with a gaseous environment such as that found around the stabilizer 12 or that found within the support frame 20 which is usually sealed to prevent gyroscopes 22 and 24 from becoming contaminated by dirt, moisture or other impurities. Alternately, the end of conduit 82 may open into a closed hydraulic fluid reservoir mounted to the frame 20. The use of a hydraulic fluid in the piston and cylinder assemblies in place of a gaseous fluid is generally preferred because the incompressibility of the hydraulic fluid greatly reduces compliance in the viscous damping apparatus described in greater detail below.

In a similar manner, a flexible fluid manifold 84 having an open conduit 86 interconnects the cylinder chambers of the opposed pair of piston and cylinder assemblies 74 and 78. Pivotal motions of the gyroscopes about the vertical axes 48 and 58 actuate the assemblies 74 and 78 to cause fluid to flow through manifold 84 and conduit 86 in a direction depending on the direction of the pivotal motions about the axes. The open end of the conduit 86 is connected to the same fluid environment as conduit 82 so that fluid displaced through manifold 84 is exhausted or ingested through the conduit 86.

Each of the conduits 82 and 86 in which a fluid flow is created by the pivotal motions of the gyroscopes about axes 48,52, and 58, 62 is provided with an adjustable fluid orifice which can restrict or cut off the fluid flow to viscously damp the pivotal motions and the gyroscopic stabilizing effect of the stabilizer 12 on the instrument 10. An adjustable fluid orifice 90 located in the conduit 82 and mounted in the pistol grip 40 (FIG. 1) has a mechanically actuated plunger 92 connected through an operating linkage 94 to a manual trigger 96 pivotally mounted on the support frame 20 as shown in FIG. 1. An adjustable fluid orifice 100 positioned in the conduit 86 and mounted in pistol grip 40 has a mechanically actuated plunger 102 also connected through the operating linkage 94 to the trigger 96. When the trigger 96 is manually depressed, the operating linkage 94 is actuated so that the plungers 92 and 102 reduce the size of the fluid passageways through the orifices 90 and 100 and restrict the flow of fluid in conduits 82 and 86 and manifolds 80 and 84. A restriction of the flow in manifold 80 causes the piston and cylinder assemblies 72 and 76 to produce viscous damping forces which oppose the relative motions of flanges 50 and 60 and therefore, the pivotal motions of the gyroscopes 22 and 24 about the horizontal axes 52 and 62 respectively. In the same manner, restriction of the flow in manifold 84 generates forces through the piston and cylinder assemblies 74 and 78 which forces oppose the pivotal motions of the gyroscopes 22 and 24 about the verticle axes 48 and 58 respectively. Since the adjustable orifices 90 and 100 are operated simultaneously by operating linkage 94 and trigger 96, any pivotal motion of the gyroscopes about axes transverse to the spin axes is viscously damped due to the orifices 90 and 100, and, as a consequence, the stabilizing effect of the gyroscopes is also damped or limited.

If the trigger 96 is depressed fully, the operating linkage 94 causes the plungers 92 and 102 to seat and completely close off the passageways through the adjustable orifices 90 and 100. The orifices are, therefore, adjustable between a full-flow and no-flow condition. When flow in the conduits 82 and 86 is cut off, the piston and cylinder assemblies 72, 74, 76 and 78 become rigid and cooperate to lock the gyroscopes 22 and 24 together which prevents the gyroscopes from pivoting with respect to each other or the frame 20. Since the gyroscopes have counter rotating gyroscopic masses and equal rotational momentums, equal and opposite gyroscopic moments are interreacted through the piston and cylinder assemblies without transmitting any net stabilizing effect to the frame 20.

From the foregoing, it is apparent that an adjustable damping effect can be created by depressing the trigger 96 to the extent desired to reduce or entirely eliminate any gyroscopic stabilizing effect on the optical insturment 10. The optical axis 14 can then be moved from one position to another with little or no opposition from the stabilizer 12. When the new position has been reached, the trigger 96 is released and the gyroscopes 22 and 24 again cooperate through coupling 30 to transmit restoring moments additively to the support frame 20.

FIG. 5 shows another viscous damping mechanism 110 which may be used in place of the damping mechanism 32 shown in FIGS. 1–4 to damp the stabilizing effect of the gyroscopes 22 and 24. The mechanism 110 is composed of four piston and cylinder assemblies 112,114,116 and 118 arranged in opposed pairs and extending between the flanges of the gyroscopes parallel to each other and to the spin axes in the aligned positions. Each assembly has a universal connection with the flanges 50 and 60 and the universal connections are distributed at 90° intervals about the spin axes. The opposed pair of piston and cylinder assemblies 112 and 116 have the pistons connected to the flange 50 adjacent the axis 48 and the cylinders connected to the flange 60 adjacent the axis 58. The other opposed pair of assemblies 114 and 118 have the pistons connected to the flange 60 adjacent the axis 62 and the cylinders connected to the flanges 50 adjacent the axis 52.

The opposed pair of piston and cylinder assemblies 112 and 116 are interconnected by means of a flexible fluid conduit 120 containing an adjustable orifice 122 mounted in the grip 40. The conduit 120 is flexible to accommodate the pivotal motions of the gyroscopes about the horizontal axes 52 and 62 and the motions of the cylinders relative to one another. The orifice 122 has the same construction as the orifices 90 and 100 and includes a plunger 124 which is adjustable to restrict the fluid passageway through the conduit 120. The plunger 124 is connected to the same operating linkage 94 and manual trigger 96 shown in FIGS. 1 and 4. The opposed pair of assemblies 112 and 116 respond to pivotal motions of the gyroscopes about the horizontal axes 52 and 62 by pumping fluid from one assembly to the other through the conduit 120 and adjustable orifice 122. The direction of the flow of fluid between the assemblies reverses with the direction of pivotal motion about the axes 52 and 62. Regardless of which direction the flow takes, the plunger 124 restricts the flow and generates forces on the gyroscopes through the assemblies 112 and 116 to oppose the pivotal motions and damp the stabilizing effect.

In a similar manner, the opposed pair of piston and cylinder assemblies 114 and 118 are connected by means of a flexible conduit 130 having an adjustable orifice 132 mounted in the grip 40. The flexible character of the conduit 130 permits the cylinders of the assemblies 114 and 118 to move with the gyroscopes 22 and 24 as they pivot about vertical axes 48 and 58. The orifice 132 includes an adjustable plunger 134 which is actuated by means of the operating linkage 94 and the trigger 96.

The assemblies 114 and 118 are actuated by pivotal motions of the gyroscopes 22 and 24 about the vertical axes 48 and 58 and pump fluid back and forth through the conduit 130 and orifice 132 between the cylinder chambers. The direction of the flow in conduit 130 depends upon the direction or sense of the pivotal motions, but regardless of the sense of the motions, the orifice 132 restricts the flow of fluid and generates motion opposing forces through the assemblies 114 and 118 which damp or restrict the stabilizing effect of the gyroscopes on disturbing moments creating the pivotal motions.

The adjustable orifices 122 and 132 can be completely closed to prevent any flow of fluid through conduits 120 and 130 respectively and thereby rigidly lock the gyroscopes 22 and 24 together. With the gyroscopes 22 and 24 locked together, the stabilizing moments are interreacted and the stabilizing effect on the frame 20 and instrument 10 is eliminated.

Since the displacements of assemblies 112 and 116 are always equal and opposite and the displacements of the assemblies 114 and 118 are equal and opposite, there is no necessity to exhaust or ingest fluid through the conduits 120 and 130 as the assemblies respond to the pivotal motions. As a consequence, the viscous damping mechanism can be formed by a closed fluid system. A slightly pressurized fluid accumulator can be used to replenish fluid lost through the seals and joints of the damping mechanism.

While the present invention has been disclosed in several preferred embodiments, it should be understood that still further modifications and substitutions can be had without departing from the spirit of the invention. For example, since the coupling 30 constrains the gyroscopes 22 and 24 to simultaneous pivotal displacements, it is possible to connect the damping mechanisms 32 or 110 between either one of the gyroscopes 22 or 24 and the frame 20 to obtain the same damping effect. Adjustable fluid orifices can be provided for each piston and cylinder assembly and mounted on the assemblies. Furthermore, the piston and cylinder assemblies may take the form of rotary dampers or actuators located along the pivot axes of the universal joints 26 or 28 between one of the gyroscopes 22 or 24 and the support frame 20. Accordingly, although several preferred embodiments of the invention are shown and described, the invention has been described by way of illustration rather than limitation.

I claim:

1. A damped gyroscopic stabilizer comprising: a frame; a pair of gyroscopes, each gyroscope having a gyroscopic mass rotatable about a spin axis; means for individually and universally pivotally mounting each gyroscope of said pair to said frame to permit the spin axes to extend in a given direction, one gyroscope of said pair being pivotable with respect to said frame about axes normal to the spin axis of said one gyroscope and the other gyroscope of said pair being pivotable with respect to said frame about axes normal to the spin axis of said other gyroscope coupling means connected between said gyroscopes for restraining said gyroscopes from simultaneous pivotal movements having the same sense about axes extending in the same direction and normal respectively to the two spin axes and for constraining said gyroscopes to pivotal motions of opposite sense about the axes extending in the same direction and normal respectively to the two spin axes; and motion damping means connected to said pair of gyroscopes for damping the pivotal movements of said gyroscopes about said axes normal to the respective spin axes of said gyroscopes.

2. A damped stabilizer as defined in claim 1 wherein the means for individually pivotally mounting comprises a first universally pivotable joint interposed between said one gyroscope of said pair and said frame and a second universally pivotable joint interposed between said other gyroscope of said pair and said frame.

3. A damped stabilizer as defined in claim 2 further including biasing means connected to said pair of gyroscopes for urging said gyroscopes toward positions in which said spin axes of said gyroscopes extend in the given direction.

4. A damped gyroscopic stabilizer as defined in claim 1 wherein said motion damping means comprises means for viscously damping the universal pivotal motions of said gyroscopes with respect to said frame.

5. A damped gyroscopic stablizer as defined in claim 4 wherein said means for viscously damping includes a fluid damper connected to one of said gyroscopes and composed of a piston and cylinder assembly, the piston being displaceable within the fluid chambers of the cylinder in response to a pivotal motion of said one of said gyroscopes, and an orificed fluid conduit means communicating with at least one fluid chamber of said cylinder to restrict the flow of fluid generated by said piston into or out of said one fluid chamber during displacement of said piston within said cylinder.

6. A damped gyroscopic stabilizer as defined in claim 5 wherein said orificed fluid conduit means includes an adjustable fluid orifice.

7. A damped gyroscopic stabilizer as defined in claim 6 wherein said adjustable fluid orifice is adjustable between a flow and no-flow condition.

8. A damped gyroscopic stabilizer as defined in claim 4 wherein the means for universally pivotally mounting supports said gyroscopes of said pair with the spin axes at one pivotal position of said pair coaxially aligned along said given direction; and wherein said means for viscously damping comprises two pairs of fluid displacing piston and cylinder assemblies and adjustable orificing means connected to the assemblies for limiting the flow of fluid displaced by each of said assemblies, each of said assemblies extending between said gyroscopes of said pair parallel to said given direction.

9. A damped gyroscopic stablizer as defined in claim 8 wherein a first group of universally pivotal joints are attached to the one gyroscope of said pair at equally spaced stations about the spin axis of the one gyroscope; a second corresponding group of universally pivotal joints are attached to the other gyroscope of said pair at equally spaced stations about the spin axis of the other gyroscope; and the first and second groups of universally pivotal joints connect said piston and cylinder assemblies to each of said gyroscopes.

10. A damped gyroscopic stabilizer as defined in claim 1 wherein said coupling means comprises means for constraining said gyroscopes to pivotal motions of equal magnitude and opposite sense about the axes extending in the same direction and normal respectively to the two spin axes; and said motion damping means comprises adjustable means for adjustably damping the constrained pivotal motions.

11. A gyroscopic stabilizing device comprising: a supporting frame; a first gyroscopic unit and a second gyroscopic unit composed respectively of a first gyroscopic mass rotatable about a spin axis and a second gyroscopic mass rotatable about a spin axis normally aligned with the spin axis of said first gyroscopic mass, said units further including first and second drive motor means connected respectively to said first mass and said second mass for rotating said masses in opposite senses with respect to one another about the normally aligned spin axes; first mounting means connected between said first gyroscopic mass and said supporting frame to permit said first gyroscopic mass to pivot with respect to said frame about axes perpendicular to the spin axis of said first gyroscopic mass at the normally aligned position of the spin axes; second mounting means connected between said second gyroscopic mass and said supporting frame to permit said second gyroscopic mass to pivot with respect to said frame about axes perpendicular to the spin axis of said second gyroscopic mass at the normally aligned position of the spin axes; coupling means interconnecting said first and second gyroscopic masses for constraining said first and second gyroscopic masses to simultaneous pivotal motions about the perpendicular axes which motions are equal in magnitude and opposite in sense with respect to said supporting frame; and adjustable damping means connected between said first gyroscopic mass and said second gyroscopic mass for damping said simultaneous pivotal motions in opposite senses with respect to said supporting frame.

12. A gyroscopic stabilizing device as defined in claim 11 wherein said adjustable damping means has an adjustment limit at which said first gyroscopic mass and said second gyroscopic mass are prevented from pivoting with respect to said supporting frame.

13. A gyroscopic stabilizing device as defined in claim 12 wherein said adjustable damping means comprises viscous damping means having an adjustable orifice in a fluid conduit, said adjustable orifice being adjustable in said fluid conduit to close said fluid conduit at said adjustment limit.

* * * * *